(12) United States Patent
Sawhney et al.

(10) Patent No.: US 8,370,312 B1
(45) Date of Patent: Feb. 5, 2013

(54) SYSTEMS AND METHODS FOR USING CLOUD-BASED STORAGE TO OPTIMIZE DATA-STORAGE OPERATIONS

(75) Inventors: Sanjay Sawhney, Cupert, CA (US); Hemant Puri, Milpitas, CA (US); Hans Van Rietschote, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 402 days.

(21) Appl. No.: 12/560,374

(22) Filed: Sep. 15, 2009

(51) Int. Cl.
*G06F 7/00* (2006.01)
*G06F 17/00* (2006.01)
(52) U.S. Cl. ........................................ 707/694; 714/768
(58) Field of Classification Search .................. 707/640, 707/652, 694; 711/161; 714/768
See application file for complete search history.

(56) References Cited

U.S. PATENT DOCUMENTS

| | | | |
|---|---|---|---|
| 8,010,498 B2 * | 8/2011 | Gounares et al. | 707/665 |
| 2011/0055161 A1 * | 3/2011 | Wolfe | 707/652 |

OTHER PUBLICATIONS

Zhan Ying et al., Cloud Storage Management Technology, May 21-22, 2009, IEEE, 309-311.*
How Dispersed Storage Technology Works; accessed on Aug. 17, 2009; http://www.cleversafe.org/dispersed-storage, all pages.
Wuala—The Social Online Storage; accessed on Aug. 17, 2009; http://www.wuala.com, 3 pages.

\* cited by examiner

*Primary Examiner* — Jean B Fleurantin
(74) *Attorney, Agent, or Firm* — Advantedge Law Group

(57) ABSTRACT

A computer-implemented method for using cloud-based storage to optimize data-storage operations may include: 1) receiving a request from a client device for instructions or directions for storing a data object, 2) accessing a data-placement policy that contains criteria for identifying storage systems suitable for storing the data object, 3) identifying, based at least in part on the data-placement policy, a plurality of storage systems for storing the data object, at least one of the storage systems including a third-party Internet-based storage system, and then 4) directing the client device to store the data object on the identified storage systems.

13 Claims, 8 Drawing Sheets

SYSTEMS AND METHODS FOR USING CLOUD-BASED STORAGE TO OPTIMIZE DATA-STORAGE OPERATIONS

BACKGROUND

In recent years, the popularity and prevalence of cloud-based storage systems has increased dramatically. Cloud-based storage offers virtually unlimited storage and worldwide access to data via the Internet to users, applications, and services.

Unfortunately, an end user's experience with cloud-based storage may be negatively impacted by a variety of factors, including: 1) network problems (such as a network outages and bandwidth and latency issues), 2) data-center outages, 3) poor reliability of provider hardware, 4) storage provider bankruptcy, and the like. As such, the instant disclosure identifies a need for improving the performance and reliability of cloud-based storage systems and for using the same in combination with traditional enterprise-based storage systems.

SUMMARY

As will be described in greater detail below, the instant disclosure generally relates to systems and methods for using cloud-based storage to optimize data-storage operations. In one example, an exemplary server-side method for accomplishing this task may include: 1) receiving a request from a client device for instructions or directions for storing a data object (such as a file or data block), 2) accessing a data-placement policy that contains criteria for identifying storage systems suitable for storing the data object, 3) identifying, based at least in part on the data-placement policy, a plurality of storage systems for storing the data object, at least one of the storage systems including a third-party Internet-based storage system (i.e., an online or cloud-based storage system hosted by an online storage provider), and then 4) directing the client device to store the data object on the identified storage systems.

In some examples, the server may identify storage systems for storing the data object by identifying storage systems that satisfy the criteria of the data-placement policy. This criteria may be based at least in part on the reliability of a particular storage system (e.g., historical uptime, etc.), the bandwidth or storage capacity of a particular storage system, the monetary costs associated with storing data on a particular storage system, the location of a particular storage system relative to the client device (as determined, e.g., by the number of hops between the client device and the storage system), the performance of a particular storage system (as determined, e.g., by the access and response times of a particular storage system), at least one characteristic of the data object (e.g., whether the data object is of a specific file type or is frequently accessed), at least one characteristic of the client device (e.g., whether the client device is of a specific device type, such as a mobile phone or desktop), at least one characteristic of a user of the client device, and/or any other criteria that may be used to identify storage systems suitable for storing the data object.

In one example, the server may direct the client device to store the data object on the identified storage systems by directing the client device to: 1) encode the data object using an error-correction algorithm and then 2) store encoded data generated by the error-correction algorithm on the identified storage systems. In this example, the level of redundancy introduced by the error-correction algorithm may be based at least in part on the data-placement policy. In some examples, the server may also direct the client device to encrypt the encoded data generated by the error-correction algorithm. In one embodiment, this error-correction algorithm may represent an erasure-coding algorithm, such as a Reed-Solomon erasure-coding algorithm.

In some examples, the server may direct the client device to store the data object on the identified storage systems by providing identification information associated with the storage devices to the client device. This identification information may include, for example, an autonomous system number, all or a portion of an IP address (such as a host ID, a network ID, and/or a subnet ID), a MAC address, or the like.

In one example, the server may identify storage systems suitable for storing the data object by evaluating the storage systems using at least one evaluation metric. Examples of suitable evaluation metrics include, without limitation, metrics for evaluating the reliability of a storage system, the performance of a storage system, the storage capacity of a storage system, the bandwidth capacity of a storage system, service level agreement(s) associated with a storage system, or the like. In some examples, the server may use the results of these metrics to calculate a quality-of-service score for the storage systems.

In one example, the above-described server-side method may also include: 1) receiving a request from the client device for instructions or directions for accessing (e.g., reading or restoring) the data object, 2) accessing a data-access policy that includes criteria for identifying storage systems suitable for providing access to the data object, 3) identifying, based at least in part on the data-access policy, at least one storage system for providing access to the data object, and then 4) directing the client device to access the data object from the identified storage system. Examples of the type of criteria that may be included within the data-access policy may include criteria based at least in part on the location of a particular storage system relative to the client device, the performance of a particular storage system, the availability of a particular storage system, the reliability of a particular storage system, the bandwidth capacity of a particular storage system, or the like.

In some examples, the exemplary server-side method may also include determining that the data object represents a file of a specific file type (such as a multimedia file). In this example, the server may direct the client device to: 1) encode the file using a layered-coding algorithm to provide graded quality-of-access to the file, 2) and then store the encoded data generated by the layered-coding algorithm on the identified storage systems. When the server later receives a request from a client device for directions for accessing this file, the server may then: 1) identify quality-of-access needs of the client device (which may depend, for example, on the device's connection speed or device type), 2) identifying at least one storage system that contains encoded data generated by the layered-coding algorithm data that satisfies the quality-of-access needs of the client device, and then 3) directing the client device to access the encoded data that satisfies its quality-of-access needs from the identified storage system.

In one example, the exemplary server-side method described above may also include migrating data from at least one of the storage systems to another storage system due to, for example, the failure of a particular storage system (due to, e.g., hardware failures, disasters, bankruptcy, etc.), the reliability (or lack thereof) of a particular storage system, the bandwidth capacity (or lack thereof) of a particular storage system, the storage capacity (or lack thereof) of a particular storage system, monetary costs associated with storing data on a particular storage system, the performance of a particular storage system, the location of a particular storage system, at least one characteristic of the data object (e.g., whether the data object is of a specific file type or is frequently accessed), and/or a combination of one or more of the same.

In some examples, the server-side method may also include creating and storing an object-to-fragment map for the data object that identifies encoded data associated with the data object, a fragment-to-location map for the data object that identifies the location of the encoded data within the identified storage systems, and/or a metadata catalog for the client device, a user of the client device, and/or an organization associated with the user of the client device (such as an employer of the user of the client device). In one example, the server-side method may also include backing up the object-to-fragment map, the fragment-to-location map, and/or the metadata catalog to at least one of the storage systems.

In an additional embodiment, an exemplary client-side method for using cloud-based storage to optimize data-storage operations may include: 1) sending a request to a data-management server for instructions or directions for storing a data object, 2) receiving directions from the data-management server for storing the data object on a plurality of storage systems, with at least one of the storage systems representing a third-party Internet-based storage system, and then 3) storing the data object on the storage systems in accordance with the directions received from the data-management server. As detailed above, the directions received from the data-management server may be derived based at least in part on a data-placement policy maintained by the data-management server.

In the above example, the client device may store the data object on the storage systems by: 1) encoding the data object using an error-correction algorithm, 2) encrypting encoded data generated by the error-correction algorithm, and then 3) storing the encrypted encoded data on the storage systems.

In some examples, the client device may communicate with Internet-based storage systems via Internet-based protocols. In this example, the client device may virtualize APIs (such as SOAP or REST) used by such Internet-based storage systems.

In one example, the exemplary client-side method may also include providing virtualized access to the data object stored on the storage systems (by, e.g., presenting the data object within a networked or virtualized folder or volume). This client-side method may also include maintaining a cache object that contains cached writes to the data object and/or a cached copy of recently accessed data.

Corresponding systems and computer-readable media are also disclosed. For example, a computer-readable medium may include one or more computer-executable instructions that, when executed by at least one processor of a computing device, may cause the computing device to: 1) receive a request from a client device for instructions or directions for storing a data object, 2) access a data-placement policy that contains criteria for identifying storage systems suitable for storing the data object, 3) identify, based at least in part on the data-placement policy, a plurality of storage systems for storing the data object, at least one of the storage systems including a third-party Internet-based storage system, and then 4) direct the client device to store the data object on the identified storage systems.

In another embodiment, a computer-readable medium may include one or more computer-executable instructions that, when executed by at least one processor of a computing device, may cause the computing device to: 1) send a request to a data-management server for directions for storing a data object, 2) receive directions from the data-management server for storing the data object on a plurality of storage systems, with at least one of the storage systems representing a third-party Internet-based storage system, and then 3) store the data object on the storage systems in accordance with the directions received from the data-management server.

As will be explained in greater detail below, by managing the placement of and access to data stored on both cloud-based storage systems and traditional enterprise-based storage systems, the systems and methods described herein may effectively increase the reliability and/or performance of such storage systems. Moreover, by accounting for the characteristics of various data objects, devices, and storage systems, the systems and methods described herein may enable storage providers to effectively manage and improve the experience of end-users that make use of such storage systems.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
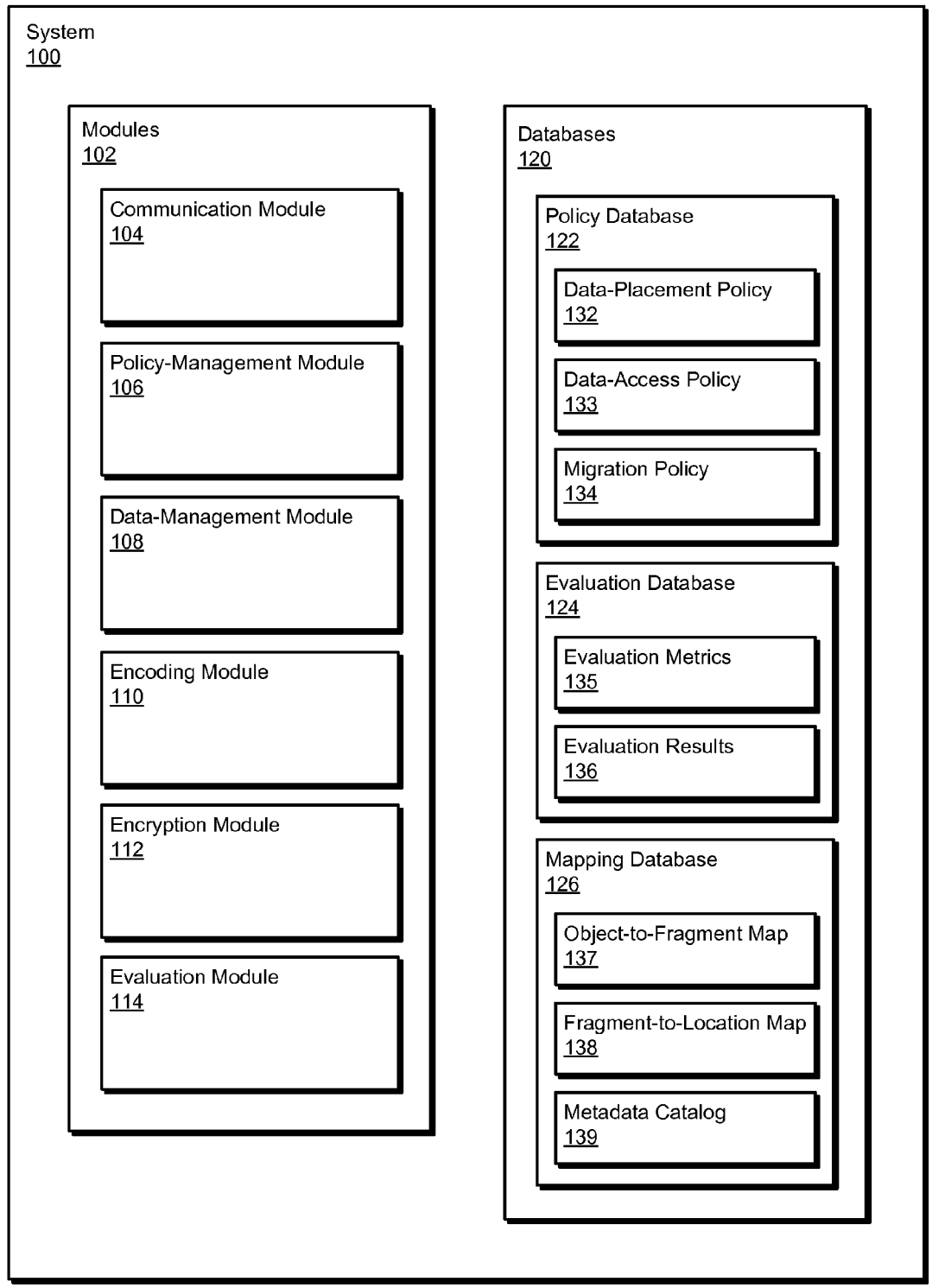
FIG. 1 is a block diagram of an exemplary system for using cloud-based storage to optimize data-storage operations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using cloud-based storage to optimize data-storage operations. The terms "cloud-based storage" and "Internet-based storage," as used herein, generally refer to any type or form of storage system that may be accessed via the Internet. Examples of Internet-based storage systems offered by online storage providers include, without limitation, AMAZON S3, NIRVANIX SDN, ELASTICDRIVE, IBACKUP, and the like.

Figure 2:
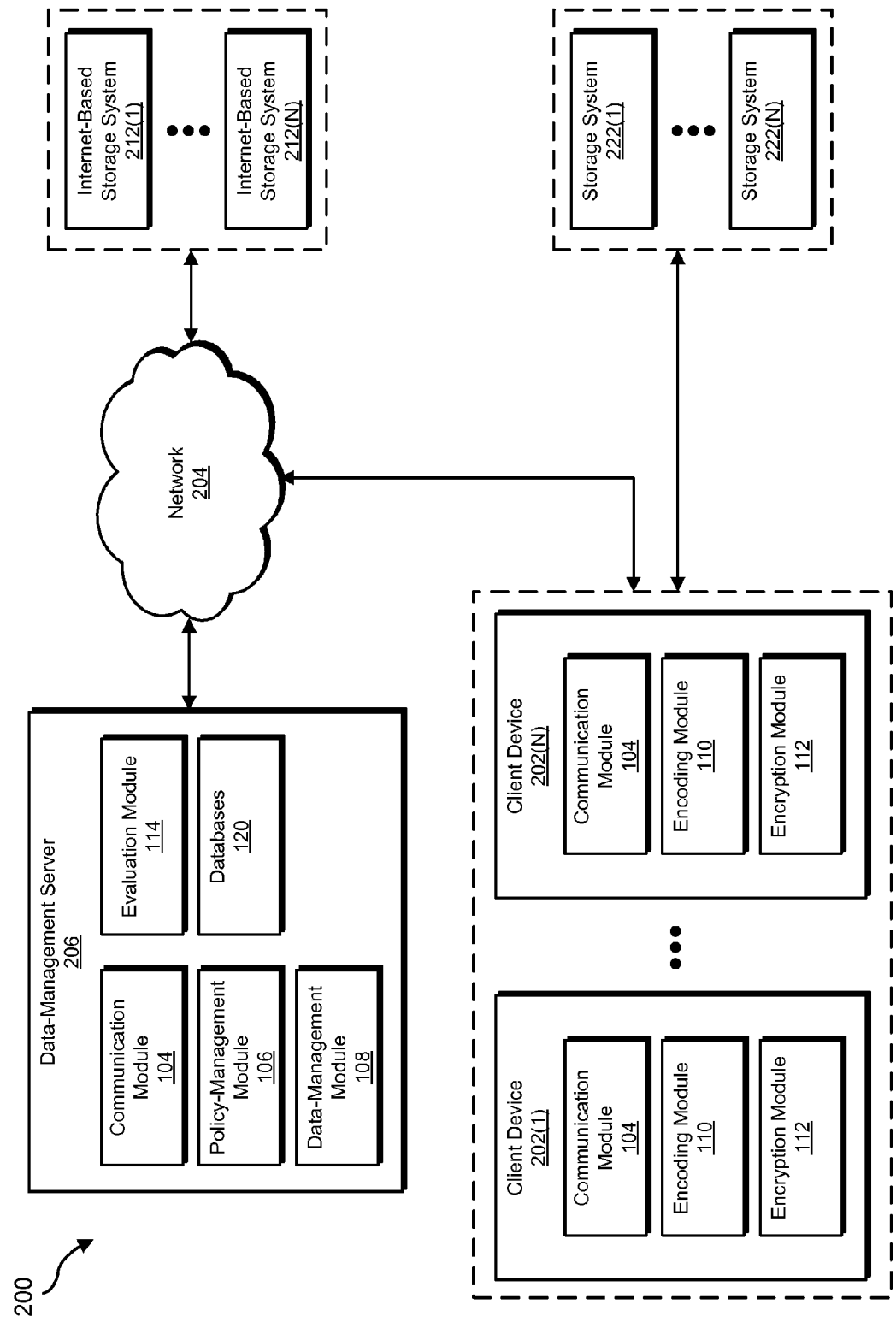
FIG. 2 is a block diagram of an exemplary system for using cloud-based storage to optimize data-storage operations.
Figure 3:
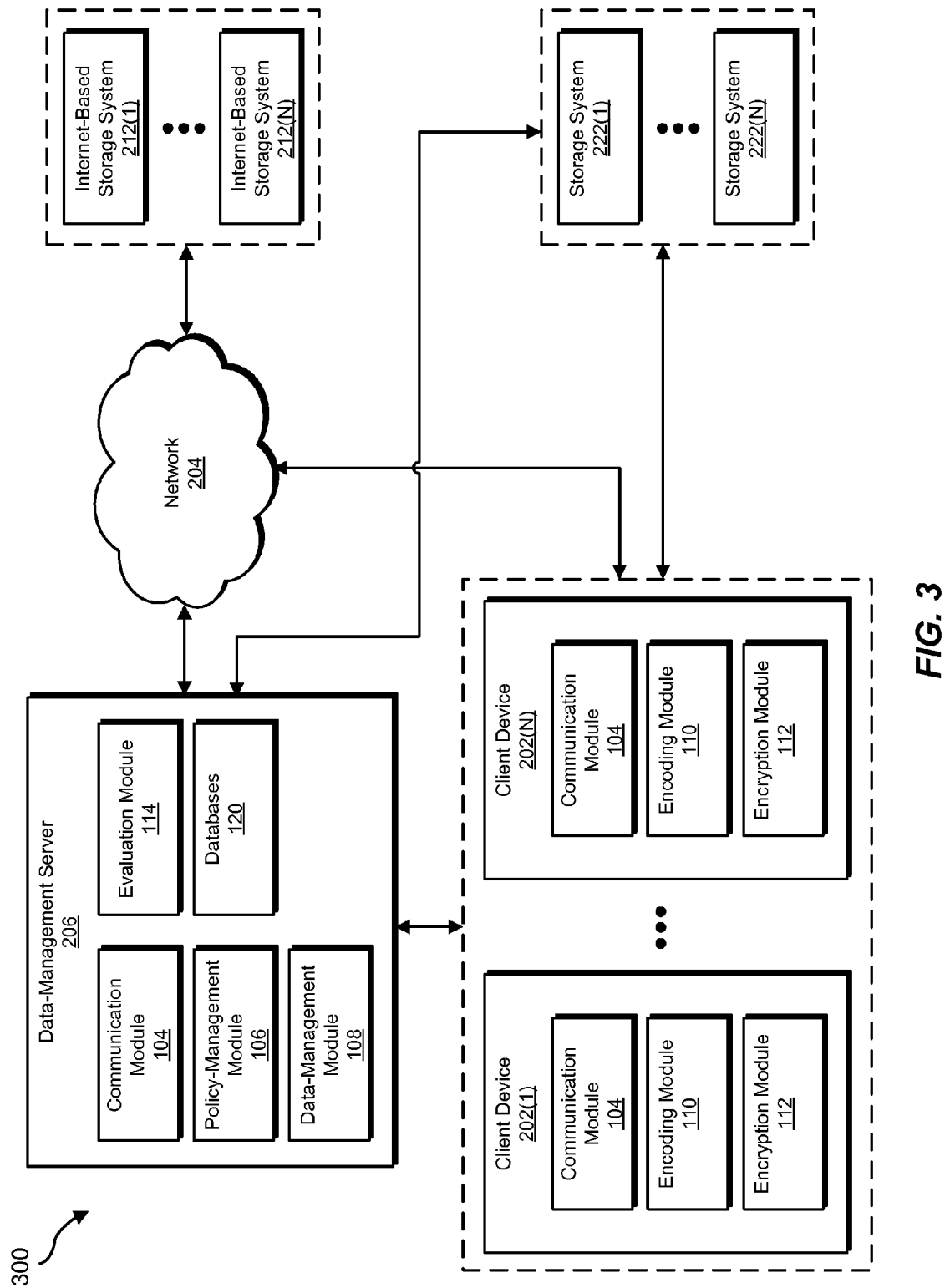
FIG. 3 is a block diagram of an additional exemplary system for using cloud-based storage to optimize data-storage operations.

The following will provide, with reference to FIGS. 1-3, detailed descriptions of exemplary systems for using cloud-based storage to optimize data-storage operations. Detailed descriptions of corresponding computer-implemented methods will also be provided in connection with FIGS. 4-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for using cloud-based storage to optimize data-storage operations. As illustrated in this figure, exemplary system 100 may include one or more modules 102 for performing one or more tasks. For example, and as will be explained in greater detail below, exemplary system 100 may include a communication module 104 programmed to facilitate communication between client devices (such as client devices 202(1)-(N) in FIGS. 2 and 3), data-management servers (such as data-management server 206 in FIGS. 2 and 3), and storage systems (such as storage systems 212(1)-(N) and 222(1)-(N) in FIGS. 2 and 3). Exemplary system 100 may also include policy-management module 106 programmed to access and manage various data-placement and data-access policies, as detailed below.

In addition, exemplary system 100 may include a data-management module 108 programmed to manage the storage of and access to data. Exemplary system 100 may also comprise an encoding module 110 and an encryption module 112 respectively programmed to encode and encrypt data objects. Exemplary system 100 may also comprise an evaluation module 114 for evaluating the quality of various storage systems and providers. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., client devices 202(1)-(N) and/or data-management server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a policies database 122 for storing data-placement policies 132, data-access policies 133, and data-migration policies 134, as detailed below. Exemplary system 100 may also include an evaluation database 124 for storing evaluation metrics 135 for evaluating storage systems and the results 136 of such evaluation metrics. Exemplary system 100 may also include a mapping database 126 for storing object-to-fragment maps 137, fragment-to-location maps 138, and metadata catalogs 139, as will be explained below.

Databases 120 in FIG. 1 may represent a portion of one or more computing devices. For example, databases 120 may represent a portion of client devices 202(1)-(N) and/or data-management server 206 in FIG. 2, computing system 710 in FIG. 7, and/or portions of exemplary network architecture 800 in FIG. 8. Alternatively, databases 120 in FIG. 1 may represent one or more physically separate devices capable of being accessed by a computing device, such as client devices 202(1)-(N) and/or data-management server 206 in FIG. 2, computing system 710 in FIG. 7, and/or portions of exemplary network architecture 800 in FIG. 8.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a plurality of client devices 202(1)-(N) in communication with a data-management server 206 and a plurality of Internet-based storage systems 212(1)-(N) via a network 204. Client devices 202(1)-(N) may also be in communication with a plurality of enterprise-based storage systems 222(1)-(N). In one embodiment, and as will be described in greater detail below, data-management server 206 may be programmed to: 1) receive a request from a client device (such as client device 202(1)) for instructions or directions for storing a data object (such as a file or data block), 2) access a data-placement policy (such as data-placement policy 132 in FIG. 1) that contains criteria for identifying storage systems suitable for storing the data object, 3) identify, based at least in part on the data-placement policy, a plurality of storage systems (such as a subset of storage systems 212(1)-(N) and 222(1)-(N)) for storing the data object, at least one of the storage systems including a third-party Internet-based storage system (such as Internet-based storage systems 212(1)-(N)), and then 4) direct the client device to store the data object on the identified storage systems.

Similarly, client devices 202(1)-(N) may be programmed to: 1) send a request to data-management server 206 for instructions or directions for storing a data object, 2) receive directions from data-management server 206 for storing the data object on a plurality of storage systems (such as a subset of storage systems 212(1)-(N) and 222(1)-(N)), with at least one of the storage systems representing a third-party Internet-based storage system, and then 3) store the data object on the storage systems in accordance with the directions received from data-management server 206.

Client devices 202(1)-(N) generally represent any type or form of computing device capable of reading computer-executable instructions. Examples of client devices 202(1)-(N) include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Data-management server 206 generally represents any type or form of computing device that is capable of managing placement of, and access to, data stored on storage systems (such as storage systems 212(1)-(N) and 222(1)-(N)). Examples of database server 206 include, without limitation, application servers and database servers configured to provide various database services and/or run certain software applications.

In the example illustrated in FIG. 2, client devices 202(1)-(N) may access data-management server 206 via network 204, which may, as detailed below, represent the Internet. In this example, data-management server 206 may reside in a highly available data center and/or be mirrored across data centers. In other examples, client devices 202(1)-(N) may directly access data-management server 206. For example, in the example illustrated in FIG. 3, data-management server 206 may be located within the same enterprise as client devices 202(1)-(N) and storage systems 222(1)-(N).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections.

Internet-based storage systems 212(1)-(N) generally represent any type or form of storage system that may be accessed via the Internet. Examples of Internet-based storage systems 212(1)-(N) include, without limitation, AMAZON S3, NIRVANIX SDN, ELASTICDRIVE, IBACKUP, and the like.

Similarly, storage systems 222(1)-(N) generally represent any type or form of local or remote data-storage system. Examples of storage systems 222(1)-(N) include, without limitation, direct-attached storage systems (such as disk arrays), storage area networks (SANs), network-attached storage systems (NASs), or any other type or form of storage device or medium capable of storing data and/or computer-readable instructions. As will be discussed in greater detail below, storage systems 222(1)-(N) may be directly attached to client devices 202(1)-(N), positioned within the same enterprise as client devices 202(1)-(N), and/or located remotely from client devices 202(1)-(N).

Figure 4:
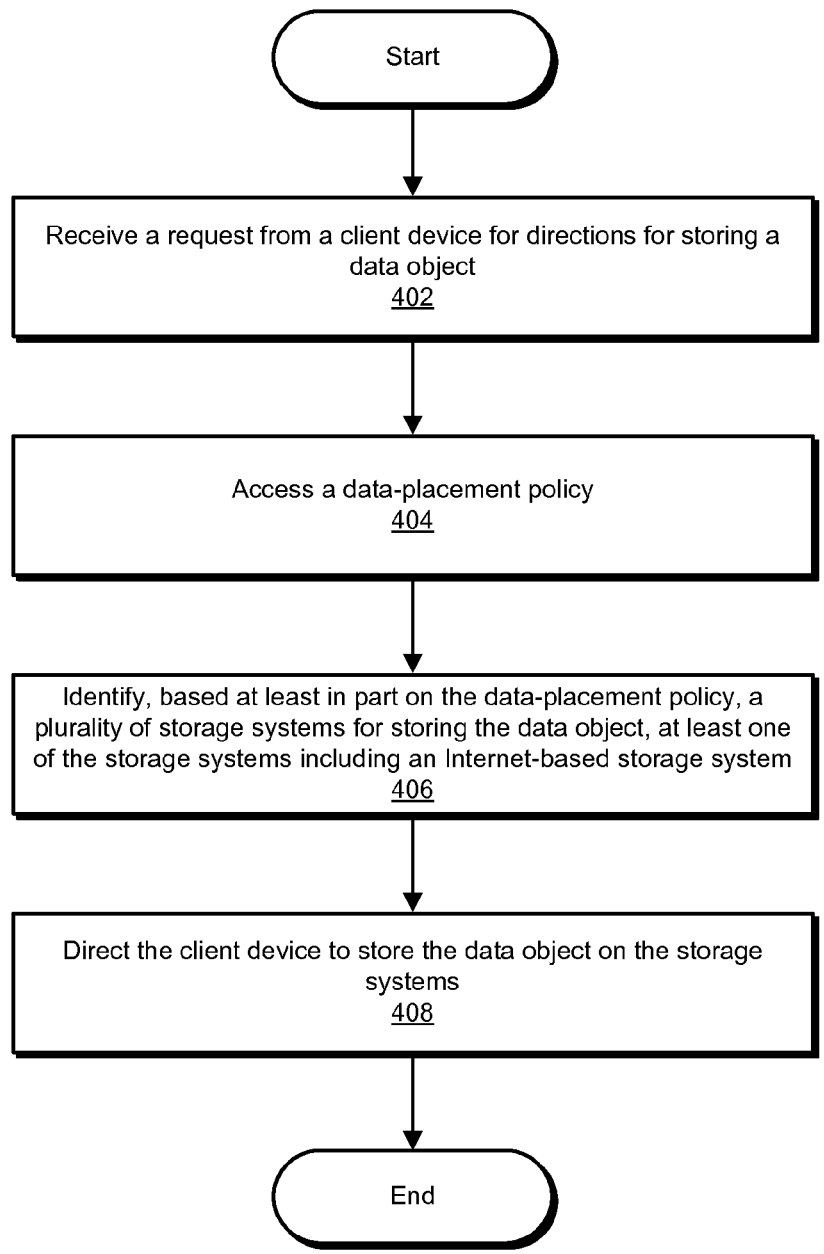
FIG. 4 is a flow diagram of an exemplary server-side method for using cloud-based storage to optimize data-storage operations.

FIG. 4 is a flow diagram of an exemplary computer-implemented method 400 for using cloud-based storage to optimize data-storage operations. The steps shown in FIG. 4 may be performed by any suitable computer-executable code and/or computing system. In some embodiments, the steps shown in FIG. 4 may be performed by one or more of the components of system 100 in FIG. 1 and/or systems 200 and 300 in FIGS. 2 and 3, respectively.

As illustrated in FIG. 4, at step 402 one or more of the various systems described herein may receive a request from a client device for directions for storing a data object. For example, communication module 104 in FIG. 1 may, as part of data-management server 206 in FIGS. 2 and 3, receive a request from client device 202(1) for directions for storing a data object (such as data object 502 in FIG. 5).

The systems described herein may perform step 402 in a variety of contexts. In one example, the request received in step 402 may represent a first request to write or store the data object. In other embodiments, the request received in step 402 may represent a request to write to an existing data object. The term "data object," as used herein, generally refers to any type or form of data structure. Examples of data objects include, without limitation, files and data blocks.

At step 404 in FIG. 4, the systems described herein may access a data-placement policy. For example, policy-management module 106 in FIG. 1 (which may, as detailed above, represent a portion of data-management server 206 in FIGS. 2 and 3) may retrieve a data-placement policy 132 from within policy database 122 of databases 120 in FIG. 1 (which may, as detailed above, represent a portion of data-management server 206).

In one example, the data-placement policy accessed in step 404 may include criteria for identifying storage systems that are suitable for storing the data object identified in step 402. Examples of the types of criteria that may be included in this data-placement policy include criteria for evaluating, without limitation, the reliability of a particular storage system (e.g., historical uptime, etc.), the bandwidth or storage capacity of a particular storage system, the monetary costs associated with storing data on a particular storage system, the location of a particular storage system relative to the client device (as determined, e.g., by the number of hops between the client device and the storage system), the performance of a particular storage system (as determined, e.g., by the access and response times of a particular storage system), at least one characteristic of the data object (e.g., whether the data object is of a specific file type or is frequently accessed), at least one characteristic of the client device (e.g., whether the client device is of a specific device type, such as a mobile phone or desktop), at least one characteristic of a user of the client device (such as whether the user is associated with a specific customer or enterprise), and/or any other criteria that may be used to identify or evaluate storage systems for storing the data object of step 402.

In one example, the data-placement policy accessed in step 404 may be associated with the client device itself, a user of the client device, and/or an organization associated with the user of the client device (such as an employer of the user of the client device). For example, data-placement policy 132 in FIG. 1 may represent a data-specific policy (e.g., "store multimedia files or frequently accessed files on high-bandwidth, low-latency storage systems"), a device-specific policy (e.g., "store data originating from mobile devices on low-cost, high-latency storage systems"), a user-specific policy (e.g., "store data originating from user X on high-latency but highly available storage systems"), and/or an organization-specific policy (e.g., "store data originating from all employees of company X on low-latency, highly available storage systems").

At step 406, the systems described herein may identify, based at least in part on the data-placement policy accessed in step 404, a plurality of storage systems (at least one of which may include a third-party Internet-based stored system) for storing the data object identified in step 402. For example, data-management module 108 in FIG. 1 (which may, as detailed above, represent a portion of data-management server 206 in FIGS. 2 and 3) may determine, by applying data-placement policy 132 in FIG. 1 to storage systems 212(1)-(N) and/or 222(1)-(N), that Internet-based storage system 212(1) and storage system 222(1) satisfy the policy's criteria for storing the data object identified in step 402.

The systems described herein may perform step 406 in a variety of ways. In one example, data-management module 108 may identify storage systems for storing the data object by identifying storage systems that satisfy the criteria of the data-placement policy accessed in step 404. For example, data-management module 108 may determine whether storage systems 212(1)-(N) and 222(1)-(N) satisfy criteria relating to reliability, bandwidth capacity, storage capacity, cost, location, and/or performance.

As detailed above, the data-placement policy accessed in step 404 may represent a data-specific policy, a device-specific policy, a user-specific policy, and/or an organization-specific policy. In these examples, data-management 108 may identify an appropriate data-placement policy by analyzing characteristics associated with the data object in question, the client device in question, the user of the client device in question, and/or an organization associated with the user of the client device in question. Upon identifying and accessing an appropriate data-placement policy, data-management module 108 may apply this policy to one or more storage systems (such as storage systems 212(1)-(N) and 222(1)-(N) in FIGS. 2 and 3) in order to identify storage systems suitable for storing the data object in question.

In some examples, data-management module 108 may continually evaluate storage systems using various evaluation metrics (such as evaluation metrics 135 in evaluation database 124 in FIG. 1) in order to determine whether these storage systems satisfy the criteria of various data-placement policies. Examples of evaluation metrics that data-management module 108 may use to evaluate storage systems include, without limitation, metrics for evaluating the reliability of a storage system, the performance of a storage system, the storage capacity of a system, the bandwidth capacity of a storage system, service level agreements associated with a storage system, or the like. In some examples, data-management module 108 may also use these evaluation metrics to evaluate storage providers (such as, e.g., AMAZON, NIRVANIX, and ELASTICDRIVE) and/or the individual points of presence operated by such providers (e.g., individual data centers operated by Internet-based storage providers).

In some examples, data-management module 108 may calculate a quality-of-service score for a storage system and/or storage provider based on the results of the above-described evaluation metrics (e.g., evaluation results 136 in evaluation database 124 in FIG. 1). For example, data-management module 108 may assign a relatively high quality-of-service score (e.g., 92, on a scale of 1-100) to storage systems (and/or the providers of such storage systems) that exhibit high reliability, performance, storage capacity, and bandwidth capacity. In contrast, data-management module 108 may assign a relatively low quality-of-service score (e.g., 12, on a scale of 1-100) to storage systems (and/or the providers of such storage systems) that exhibit relatively low reliability, performance, storage capacity, and/or bandwidth capacity.

Returning to FIG. 4, at step 408 the systems described herein may direct the client device to store the data object on the storage systems identified in step 406. For example, data-management module 108 in FIG. 1 may, as part of data-management server 206 in FIGS. 2 and 3, direct client device 202(1) to store the data object identified in step 402 on both Internet-based storage system 212(1) and storage system 222(1).

The systems described herein may perform step 408 in a variety of ways. In one example, data-management module 108 may cause data-management server 206 to provide information that identifies the storage devices to the client device. This identification information may include, for example, an autonomous system number associated with a storage system, all or a portion of an IP address associated with a storage system (such as a host ID, and network ID, and/or a subnet ID), a MAC address associated with a storage system, or the like.

In some examples, data-management module 108 may perform step 408 by instructing the client device to encode the data object in question using an error-correction algorithm and then store the encoded data generated by this error-correction algorithm on the storage systems identified in step 406. For example, data-management module 108 may instruct client device 202(1) to encode data object 502 in FIG. 5 using an error-correction algorithm.

The term "error-correction algorithm," as used herein, generally refers to any type or form of tool, algorithm, or code for generating redundant data. Examples of error-correction algorithms include, without limitation, erasure-coding algorithms, such as Reed-Solomon erasure-coding algorithms. In some examples, the level of redundancy introduced by such error-correction algorithms may be based at least in part on the data-placement policy accessed in step 404. For example, data-placement policy 132 in FIG. 1 may specify the number of redundant fragments to be generated when erasure-encoding a data object.

Figure 5:
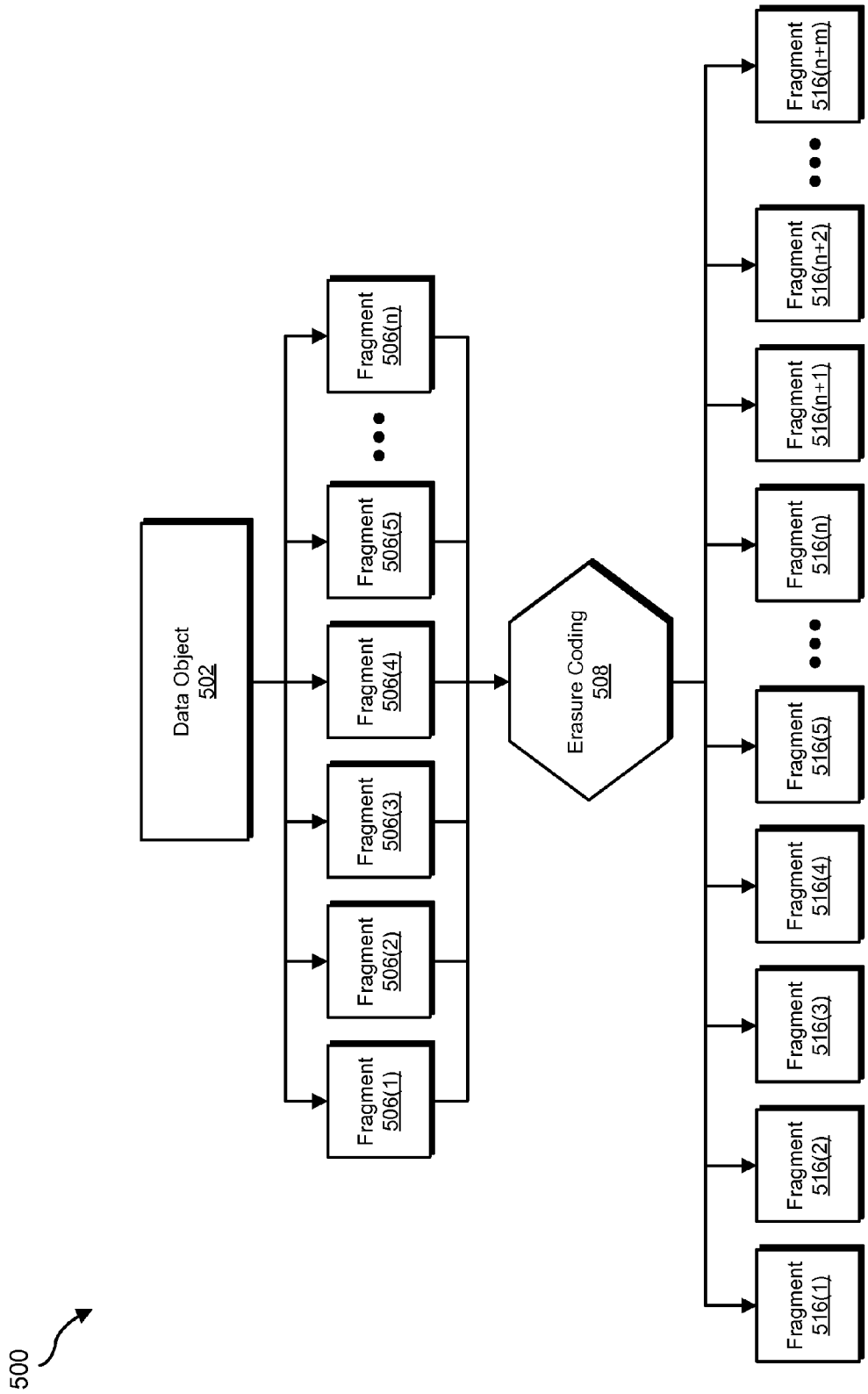
FIG. 5 is a block diagram illustrating an exemplary process for encoding data objects.

FIG. 5 is a block diagram of an exemplary process for encoding data object 502 using an error-correction algorithm. As illustrated in this figure, a client device (such as client device 202(1) in FIGS. 2 and 3) may fragment a data object 502 into a plurality of fragments 506(1)-(N). Client device 202(1) may then apply an erasure-coding algorithm 508 (such as a Reed-Solomon erasure-coding algorithm) to fragments 506(1)-(N). In this example, erasure-coding algorithm 508 may generate encoded fragments 516(1)-(N) and a plurality of redundant fragments 516(N+1)-(N+M). As detailed above, the number of redundant fragments generated by erasure-coding algorithm 508 may be dictated by data-placement policy 132 in FIG. 1.

In some examples, data-management module 108 may also instruct the client device to encrypt the encoded data generated by the error-correction algorithm. For example, data-management module 108 may instruct client device 202(1) to encrypt fragments 516(1)-(N) and fragments 516(N+1)-(N+M) using one or more encryption algorithms.

As detailed above, data-management module 108 may instruct the client device to store the encoded data generated by the error-correction algorithm on the storage systems identified in step 406. For example, data-management module 108 may instruct client device 202(1) to disperse fragments 516(1)-(N) and 516(N+1)-(N+M) among both Internet-based storage system 212(1) and storage system 222(1) in FIGS. 2 and 3. In some examples, data-management module 108 may instruct client device 202(1) to allocate the disbursement of these encoded fragments between Internet-based storage system 212(1) and storage system 222(1) based on, or in accordance with, data-placement policy 132 in FIG. 1. As detailed above, data-placement policy 132 may allocate or disperse the storage of data objects or fragments of data objects based on the reliability, bandwidth capacity, storage capacity, monetary cost, location, and/or performance of storage systems and/or the characteristics of the data object in question, the client device in question, a user of the client device in question, and/or an organization associated with the user of the client device in question.

In some examples, data-management module 108 may determine that a data object identified in step 402 represents a file of a specific file type (e.g., a multimedia file, such as a .jpeg file, an .mpeg file, an .avi file, or the like) capable of supporting graded quality-of-access. In this example, data-management module 108 may instruct client device 202(1) to encode the data object using a layered-coding algorithm or other algorithm that enables graded quality-of-access. Data-management module 108 may then instruct client device 202(1) to store encoded data generated by this layered-coding algorithm on the storage systems identified in step 406.

The term "graded quality-of-access," as used herein, generally refers to the ability to modify the number of fragments of a data object provided to a client device based on the quality-of-access needs of the client device. For example, in the context of a streaming multimedia file, a mobile computing device (such as a cellular telephone) may require a lower-resolution version of the file than is required by a desktop computing device. In this example, upon receiving a request from a client device for directions for accessing the multimedia file, data-management module 108 may: 1) identify the quality-of-access needs of the client device (based on, for example, the connection speed of the client device and/or the device type of the client device), 2) identify at least one storage system that contains encoded data that satisfies the quality-of access needs of the client device, and then 3) direct the client device to access encoded data that satisfies the quality-of-access needs of the client device from the identified storage system.

For example, data-management module 108 may determine that computing device 202(1) in FIGS. 2 and 3 represents a cellular telephone with a relatively low connection speed and screen resolution. In this example, upon receiving a request from client device 202(1) for instructions or directions for accessing a multimedia file (encoded fragments of which may be stored on Internet-based storage system 212(1) and storage system 222(1) in FIGS. 2 and 3), data-management module 108 may direct client device 202(1) to stream the multimedia file from Internet-based storage system 212 (1) due to its relatively high latency. Alternatively, if data-management module 108 determines that client device 202 (1) represents a desktop computing device with a relatively high connection speed and screen resolution, then data-management module 108 may direct client device 202(1) to retrieve encoded fragments of the file from both Internet-based storage system 212(1) and storage system 222(1) in order to increase data throughout.

The systems described herein may encode data objects using layered-coding algorithms in a variety of ways. In the context of a multimedia file, these layered-coding algorithms may generate embedded bitstreams of differing bit rates that may be retrieved and decoded by client devices having differing quality-of-access needs. For example, a layered-coding algorithm may encode a multimedia file by generating a base layer that provides a specific bit rate associated with a basic level of quality. The layered-coding algorithm may then add multiple enhancement layers on top of this basic layer that may provide enhanced bit rates and, thus, enhanced quality-of access.

In some examples, data-management server 206 may create and store various maps and/or metadata catalogs. For example, data-management module 108 may create and store: 1) an object-to-fragment map (such as object-to-fragment map 137 in mapping database 126 in FIG. 1) that identifies encoded data associated with data objects, 2) a fragment-to-location map (such as fragment-to-location map 138 in FIG. 1) that identifies the location of encoded data associated with a data object within one or more storage systems, and 3) a metadata catalog (such as metadata catalog 139 FIG. 1) for a client device, a user or client device, and/or an organization associated with the user of the client device. In this example, the metadata catalogs may contain various forms of metadata for identifying policies (such as data-placement policies and data-access policies, as will be described in greater detail below) associated with specific devices, users, and organizations. These metadata catalogs may also identify the various maps (such as object-to-fragment maps and/or fragment-to-location maps) associated with devices, users, and/or organizations. In some examples, data-management module 108 may backup at least a portion of mapping database 126 (e.g., object-to-fragment map 137, fragment-to-location map 138, and/or metadata catalog 139) to at least one of storage systems 212(1)-(N) and 222(1)-(N) in FIGS. 2 and 3.

In some examples, data-management server 206 may migrate data from one storage system to another for various reasons. For example, data-management module 108 may migrate data from one storage system to another storage system due to, for example, the failure of a particular storage system (due to, e.g., hardware failures, disasters, bankruptcy, etc.), the reliability (or lack thereof) of a particular storage system, the bandwidth capacity (or lack thereof) of a particular storage system, the storage capacity (or lack thereof) of a particular storage system (in order to load balance, for example), monetary costs associated with storing data on a particular storage system, the performance of a particular storage system, the location of a particular storage system, at least one characteristic of the data object (e.g., whether the data object is of a specific file type or is frequently accessed), and/or a combination of one or more of the same. For example, data-management server 206 may migrate or move data from a primary storage system (such as storage system 222(1) in FIGS. 2 and 3) to a cloud-based storage system (such as Internet-based storage system 212(1) in FIGS. 2 and 3) when: 1) the storage capacity of the primary storage system is depleted and/or 2) the data in question has been not been accessed for a long period of time. In some examples, data-management module 108 may migrate data in accordance with a migration policy, such as migration policy 134 in FIG. 1.

In one example, data-management server 206 may also manage access to data stored on storage systems 212(1)-(N) and 222(1)-(N). For example, data-management module 108 may manage access to data by: 1) receiving a request from a client device (such as client device 202(1) in FIGS. 2 and 3) for instructions or directions for accessing (e.g., reading or restoring) a data object, 2) accessing a data-access policy (such as data-access policy 133 in policy database 122 of databases 120 in FIG. 1) that includes criteria for identifying storage systems for providing access to the data object, 3) identifying, based at least in part on the data-access policy, at least one storage system for providing access to the data object, and then 4) directing the client device to access the data object from the identified stored systems. Examples of the type of criteria that may be included within such data-access policies may include criteria based at least in part on the location of a particular storage system relative to the client device, the performance of a particular storage system, the availability of a particular storage system, the reliability of a particular storage system, the bandwidth capacity of a particular storage system, and/or combinations of one or more of the same.

Figure 6:
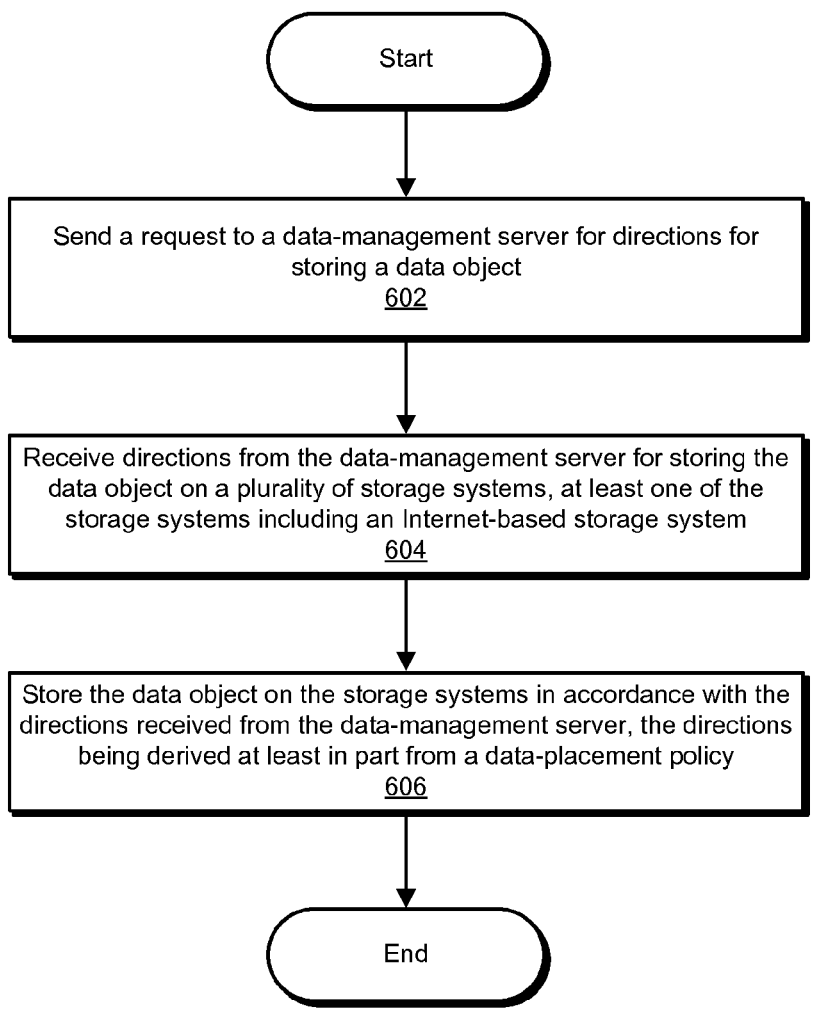
FIG. 6 is a flow diagram of an exemplary client-side method for using cloud-based storage to optimize data-storage operations.

As detailed above, the instant disclosure also identifies an exemplary client-side method for using cloud-based storage to optimize data-storage operations. FIG. 6 is a flow diagram of such a method. The steps shown in FIG. 6 may be performed by any suitable computer-executable code and/or computing system. In some embodiments, the steps shown in FIG. 6 may be performed by one or more of the components of system 100 in FIG. 1 and/or systems 200 and 300 in FIGS. 2 and 3, respectively.

As illustrated in FIG. 6, at step 602 one or more of the various systems described herein may send a request to a data-management server for directions for storing a data object. For example, communication module 104 in FIG. 1 (which may, as detailed above, represent a portion of client device 202(N) in FIGS. 2 and 3) may send a request to data-management server 206 for directions for storing a data object.

At step 604, the systems described herein may receive directions from the data-management server for storing the data object on a plurality of storage systems, at least one of which may represent a third-party Internet-based storage system, as detailed above. For example, communication module 104 may, as a part of client device 202(N) in FIG. 2, receive directions from data-management server 206 for storing the data object in question on both Internet-based storage system 212(1) and storage system 222(1) in FIGS. 2 and 3.

At step 606, the systems described herein may store the data object on the identified storage systems in accordance with the directions received from the data-management server. For example, communication module 104 may cause client device 202(N) to store the data object on Internet-based storage system 212(1) and storage system 222(1).

The various systems described herein may perform step 606 in a variety of ways, including in accordance with the various embodiments described in detail above in connection with exemplary method 400 and FIG. 4. For example, encoding module 110 and/or encryption module 112 in FIG. 1 may cause client device 202(N) to encode the data object using an error-correction algorithm, encrypt the encoded data generated by the error-correction algorithm, and then store the encrypted encoded data on the storage systems identified by data-management server 206.

As detailed above, in some examples data-management server 206 may instruct client device to allocate or disperse the storage of data objects or fragments of data objects in accordance with a data-placement policy. As explained above, such policies may allocate or disperse data objects or encoded fragments of such data objects based on the reliability, bandwidth capacity, storage capacity, monetary cost, location, and/or performance of storage systems and/or the characteristics of the data object in question, the client device in question, a user of the client device in question, and/or an organization associated with the user of the client device in question.

In some examples, communication module 104 may cause client device 202(N) to communicate with various third-party Internet-based storage systems using one or more Internet-based protocols. For example, communication module 104 may virtualize various APIs (such as SOAP or REST) commonly used by Internet-based storage providers.

In addition, in one embodiment, communication module 104 may provide virtualized access to data stored on various storage systems by, for example, presenting such data within a networked or virtualized folder or volume on a client device. For example, communication module 104 may virtualize access to data stored on storage systems 212(2)-(N) and 222(1)-(N) by providing a virtualized folder or volume on client device 202(N) for accessing the data stored on the storage systems.

In addition, in some examples the systems described herein may enable a client device to operate or function in an off-line or disconnected mode. For example, communication module 104 may generate and maintain a cached object on client device 202(N) that contains cached rights to data stored on storage systems 212(1)-(N) and 222(1)-(N). Similarly, this cached object may maintain cached copies of recently accessed data stored on storage systems 212(1)-(N) and 222(1)-(N). In this example, the cached object may enable a user of client device 202(N) to access recently accessed data and/or cache writes to data stored on the storage systems without being connected to such storage systems.

As detailed above, by managing the placement of and access to data stored on both cloud-based storage systems and traditional enterprise-based storage systems, the systems and methods described herein may effectively increase the reliability and/or performance of such storage systems. Moreover, by accounting for the characteristics of various data objects, devices, and storage systems, the systems and methods described herein may enable storage providers to effectively manage and improve the experience of end-users that make use of such storage systems.

Figure 7:
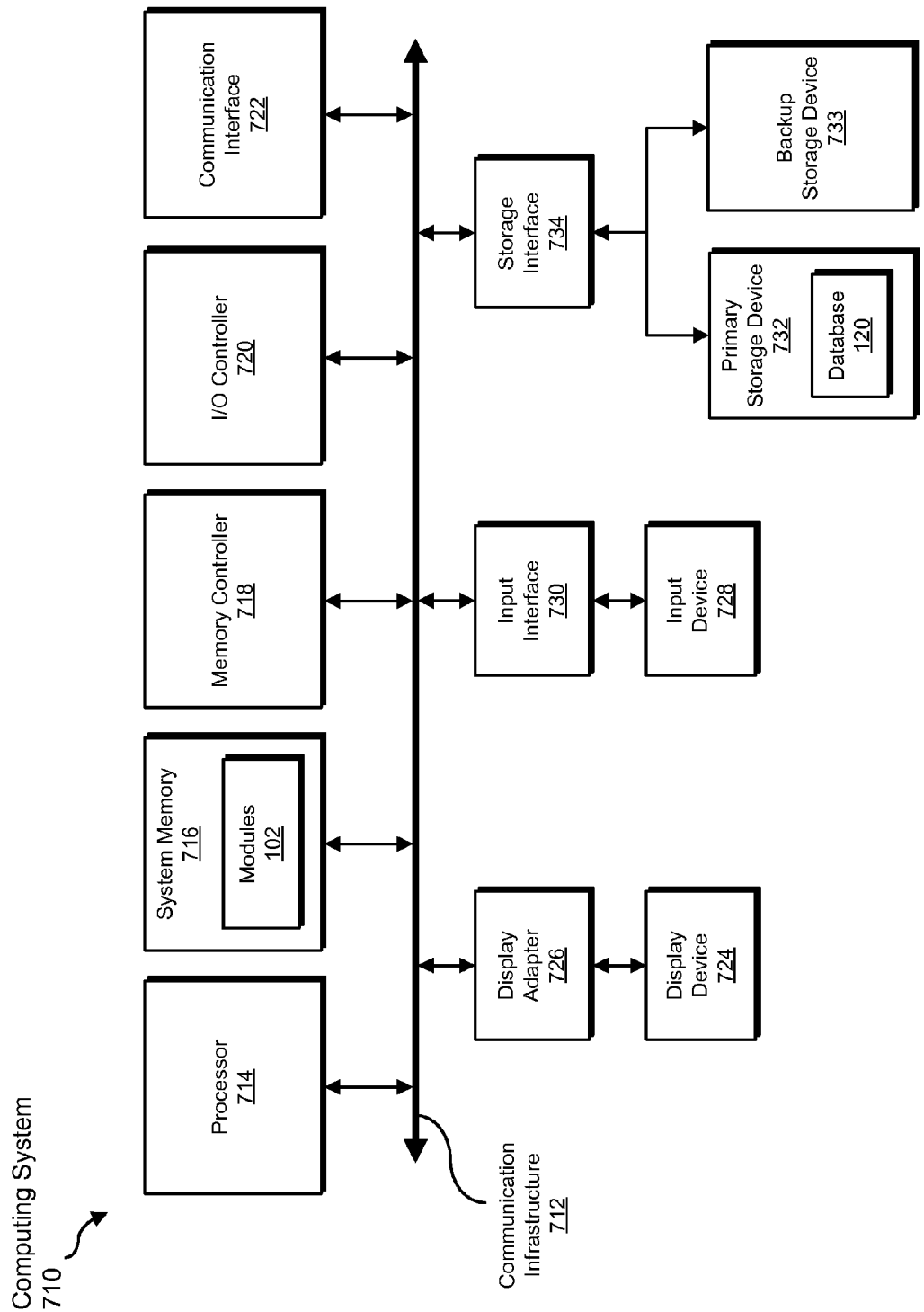
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, accessing, identifying directing, storing, encoding, encrypting, providing, evaluating, determining, migrating, creating, backing up, sending, communicating, maintaining, gerund phrases from claims steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as receiving, accessing, identifying directing, storing, encoding, encrypting, providing, evaluating, determining, migrating, creating, backing up, sending, communicating, maintaining, gerund phrases from claims.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the receiving, accessing, identifying directing, storing, encoding, encrypting, providing, evaluating, determining, migrating, creating, backing up, sending, communicating, maintaining, gerund phrases from claims steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, accessing, identifying directing, storing, encoding, encrypting, providing, evaluating, determining, migrating, creating, backing up, sending, communicating, maintaining, gerund phrases from claims steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, accessing, identifying directing, storing, encoding, encrypting, providing, evaluating, determining, migrating, creating, backing up, sending, communicating, maintaining, gerund phrases from claims steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, databases 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the receiving, accessing, identifying directing, storing, encoding, encrypting, providing, evaluating, determining, migrating, creating, backing up, sending, communicating, maintaining, gerund phrases from claims steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
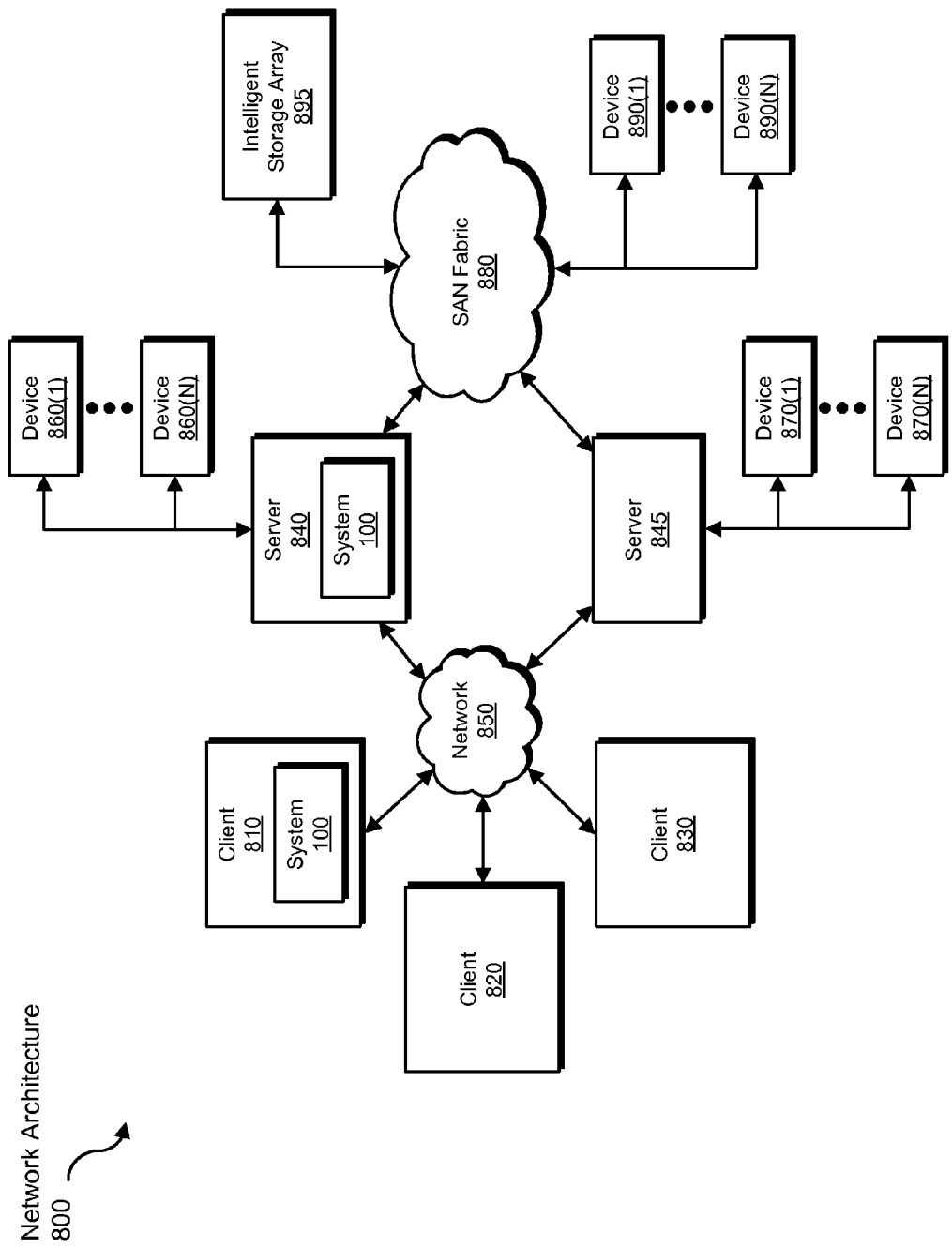
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, accessing, identifying directing, storing, encoding, encrypting, providing, evaluating, determining, migrating, creating, backing up, sending, communicating, maintaining, gerund phrases from claims steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary server-side or client-side method for using cloud-based storage to optimize data-storage operations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 in FIG. 1 may transform a property or characteristic of data-management server 206 in FIGS. 2 and 3 by creating, modifying, and/or storing maps 137 and 138 and catalogs 139 in mappings database 126 of databases 120 on data-management server 206.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using cloud-based storage to optimize data-storage operations, at least a portion of the method being performed by a data-management server comprising at least a computer with a processor, the method comprising:

receiving, at the data-management server, a request from a client device for directions for storing a data object;

accessing, at the data-management server, a data-placement policy that comprises criteria for identifying storage systems suitable for storing the data object;

identifying, at least in part by applying the data-placement policy at the data-management server, a plurality of storage systems that satisfy the criteria of the data-placement policy, at least one of the storage systems comprising a third-party Internet-based storage system;

directing, at the data-management server, the client device to store the data object on the storage systems that satisfy the criteria of the data-placement policy;

wherein directing the client device to store the data object on the storage systems that satisfy the criteria of the data-placement policy comprises directing the client device to:

encode the data object using an error-correction algorithm;

store encoded data generated by the error-correction algorithm on the storage systems that satisfy the criteria of the data-placement policy.

2. The method of claim 1, wherein the criteria of the data-placement policy is based on at least one of:

reliability of a storage system;

bandwidth capacity of a storage system;

storage capacity of a storage system;

monetary costs associated with storing data on a storage system;

location of a storage system relative to the client device;

performance of a storage system;

at least one characteristic of the data object;

at least one characteristic of the client device;

at least one characteristic of a user of the client device.

3. The method of claim 1, wherein the error-correction algorithm comprises an erasure-coding algorithm.

4. The method of claim 1, wherein a level of redundancy introduced by the error-correction algorithm is based at least in part on the data-placement policy.

5. The method of claim 1, wherein directing the client device to store the data object on the storage systems that satisfy the criteria of the data-placement policy comprises providing identification information associated with the storage systems to the client device, the identification information comprising at least one of:

an autonomous system number;

an IP address;

a host ID;

a network ID;

a subnet ID;

a MAC address.

6. The method of claim 1, further comprising evaluating the storage systems using at least one evaluation metric, the evaluation metric comprising at least one of:

a metric for evaluating the reliability of a storage system;

a metric for evaluating the performance of a storage system;

a metric for evaluating the storage capacity of a storage system;

a metric for evaluating the bandwidth capacity of a storage system;

a metric for evaluating a service level agreement associated with a storage system.

7. The method of claim 1, further comprising:

receiving a request from the client device for directions for accessing the data object;

accessing a data-access policy that comprises criteria for identifying storage systems for providing access to the data object;

identifying, based at least in part on the data-access policy, at least one storage system that satisfies the criteria of the data-access policy;

directing the client device to access the data object from the storage system that satisfies the criteria of the data-access policy.

8. The method of claim 1, further comprising determining that the data object comprises a file of a specific file type, wherein:
- directing the client device to encode the data object using the error-correction algorithm comprises directing the client device to encode the file using a layered-coding algorithm;
- directing the client device to store the encoded data generated by the error-correction algorithm on the storage systems that satisfy the criteria of the data-placement policy comprises directing the client device to store encoded data generated by the layered-coding algorithm on the storage systems that satisfy the criteria of the data-placement policy.

9. The method of claim 8, further comprising:
- receiving a request from an additional client device for directions for accessing the data object;
- identifying quality-of-access needs of the additional client device;
- identifying at least one storage system that contains encoded data generated by the layered-coding algorithm that satisfies the quality-of-access needs of the additional client device;
- directing the additional client device to access the encoded data that satisfies the quality-of access needs of the additional client device from the identified storage system.

10. The method of claim 1, further comprising migrating data from at least one of the storage systems to another storage system due to at least one of:
- failure of a storage system;
- reliability of a storage system;
- bandwidth capacity of a storage system;
- storage capacity of a storage system;
- monetary costs associated with storing data on a storage system;
- performance of a storage system;
- location of a storage system;
- at least one characteristic of the data object.

11. The method of claim 1, further comprising creating and storing at least one of:
- an object-to-fragment map for the data object that identifies the encoded data;
- a fragment-to-location map for the data object that identifies the location of the encoded data within the storage systems;
- a metadata catalog for at least one of:
  - the client device;
  - a user of the client device;
  - an organization associated with the user of the client device.

12. The method of claim 11, further comprising backing up at least one of the object-to-fragment map, the fragment-to-location map, and the metadata catalog to at least one of the storage systems.

13. A system for using cloud-based storage to optimize data-storage operations, the system comprising:
- a communication module programmed to receive, at a data-management server that comprises at least a computer with a processor, a request from a client device for directions for storing a data object;
- a policy-management module programmed to access, at the data-management server, a data-placement policy that comprises criteria for identifying storage systems suitable for storing the data object;
- a data-management module programmed to:
  - identify, at least in part by applying the data-placement policy at the data-management server, a plurality of storage systems that satisfy the criteria of the data-placement policy, at least one of the storage systems comprising a third-party Internet-based storage system;
  - direct, at the data-management server, the client device to store the data object on the storage systems that satisfy the criteria of the data-placement policy;
- wherein the data-management module directs the client device to store the data object on the storage systems that satisfy the criteria of the data-placement policy by directing the client device to:
  - encode the data object using an error-correction algorithm;
  - store encoded data generated by the error-correction algorithm on the storage systems that satisfy the criteria of the data-placement policy.

* * * * *